FORGING CONTROL
Filed April 4, 1966
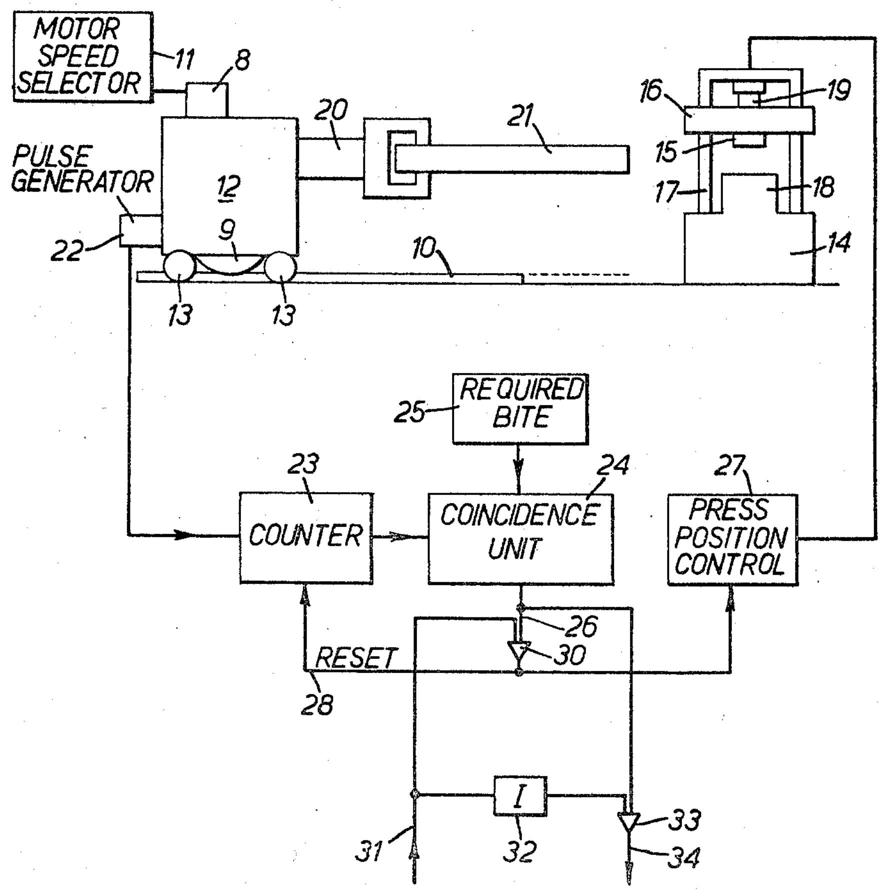
INVENTORS
G. A. FORSTER
BY C. D. COLLINSON
Holcombe, Wetherill & Brisebois
ATTORNEYS United States Patent Office 3,435,650

Patented Apr. 1, 1969

3,435,650

FORGING CONTROL

Graham Arthur Forster, Sheffield, and Christopher David Collinson, Rotherham, England, assignors to Davy and United Engineering Company Limited, Darnall Works, Sheffield, Yorkshire, England Filed Apr. 4, 1966, Ser. No. 539,826
Claims priority, application Great Britain, Apr. 7, 1965, 14,810/65
Int. Cl. B21j *13/08*
U.S. Cl. 72—24 4 Claims

ABSTRACT OF THE DISCLOSURE

A forging press and a manipulator are controlled so that a workpiece mounted on the manipulator for lengthwise movement relative thereto is forged along its length in a succession of bites by moving the manipulator at a speed determined by the operator and continuously comparing the distance moved by the manipulator with the required forging bite increment and each time the workpiece completes movement equal to said required bite increment a press cycle is automatically initiated so long as the movable press tool is at its position from which the press cycle commences, but if the press tool is not at that position a press cycle is not initiated and the movement of the manipulator is stopped. In this arrangement the manipulator controls the press and not vice versa as is usual in such arrangements.

This invention relates to the control of forging and more particularly to the integration of a press and continuously moving manipulator.

Modern high power forging presses are generally equipped with automatic press position control to control accurately the tool separation at the point at which the downward press stroke reverses and are capable of rapid operation and of forging the workpiece with precision. Manual control of manipulators demands high operators skill to achieve a selected bite and is, in comparison with press performance, relatively slow. It has been found that to use the relatively fast press speed it is desirable to keep the manipulator carriage moving continuously and mount the peel thereon for relative movement thereto, so that only the peel and workpiece need to be continuously accelerated and stopped. It has also been found desirable to integrate the control of the manipulator and press so that the workpiece is moved a preset distance (known as the bite) during each press cycle. We have found that it is more important when integrating a manipulator and a press to achieve an accurate bite per press stroke and to forge reasonably fast than to attempt to forge as fast as possible and accept a random sized bite.

According to the present invention in an integrated forging control system the press is made the slave of the manipulator.

In one aspect the invention provides a method of operating a forging press and manipulator which comprises continuously moving the manipulator at a preselected speed and automatically initiating a press cycle each time the workpiece completes movement of a preselected bite increment.

In another aspect the invention provides a control system for a forging press and workpiece manipulator comprising a control system adapted to control the operation of a forging press, means for preselecting a manipulator speed to cause the manipulator to move continuously at that speed, and means for initiating a press cycle each time the workpiece completes movement of a preselected bite increment.

In a preferred form the means for initiating the press cycle comprise a pulse generator adapted to give a pulse for each unit movement of the manipulator, a counter, a comparison circuit arranged to compare the count in the counter with a preset count representing the required bite, and means for applying a control signal when the counts are equal to initiate a press cycle and to reset the counter.

One embodiment of control circuit for a press and manipulator, in accordance with the invention, will now be described, by way of example only, with reference to the accompanying diagrammatic drawing of a control circuit.

A manipulator is shown diagrammatically at 12 mounted on wheels 13 and has a motor 8 carried thereon and arranged to drive a rotatable sprocket wheel 9 engageable with a fixed rack 10 on the ground so as to drive the manipulator at a preselected speed towards or away from a press 14. The motor 8 is preferably hydraulic for example of the type having a number of speeds which may be selected on the motor speed selector panel 11. The manipulator drive may be for example of the type described in British Patent 874,909 or U.S. Patent No. 3,226,970.

The press 14 has a movable tool 15 mounted on a crosshead 16 slidable on columns 18, and a fixed tool 18. The upper tool 15 is reciprocated towards and away from the lower tool by means of a piston and cylinder assembly 19. The manipulator has a peel 20 adapted to grip a workpiece 21, the peel being mounted on the manipulator for movement from a datum position relative thereto in either direction of forging, that is towards or away from the press. This arrangement permits the manipulator to be moved during the time the workpiece is held by the press. The peel has drive means which may be of any conventional form to return it to its datum position during the ingot free period of the press cycle. The peel drive is preferably hydraulic for example as in U.S. patent application Ser. No. 530,420. A pulse generator 22 is carried by the manipulator and arranged to give a pulse for each unit movement of the manipulator in the direction of forging; this pulse generator may be of any known form such as that made by Bendix Ericsson and sold under the name "Rotapulse."

The pulses from the generator are fed to a counter 23, the output of the counter being fed to a coincidence unit 24 which compares the count in the counter with the output of a preselector unit 25 in which is registered a count corresponding to the required bite distance. When the coincidence unit registers that the counts are equal it emits an output control signal on line 26 which is fed through AND gate 30 to the press position control system 27 to initiate a press cycle, provided that gate 30 is opened by a press reset signal on lines 31. The signal from gate 30 is also applied on line 28 to the counter to reset it to zero. By this means each time the manipulator has moved through the preset bite distance a new press cycle is initiated and the counter is restarted so that the sequence is repeated for a whole pass; thus the slower moving manipulator is used to control the fast acting press by varying the dwell time, i.e., the period for which the tool 15 is stationary at the top of its stroke. The operator must set the constant speed at which the manipulator is to move by experience or by calculating from a knowledge of the time required for the press to complete a cycle of a preselected stroke distance and the knowledge of the required bite, so that the manipulator does not travel more than a bite distance before the press has reset after making a stroke. Once the operation has been started the operator may optimise the manipulator speed by either increasing or reducing its speed depending on the observed dwell time. The press position control will preferably take the form of that described in our copending U.S. application Ser. No. 420,055, now abandoned.

The press reset signal appears on line 31 when the crosshead 16 reaches its upper limit. If, therefore, the manipulator moves through the required bite distance before the press resets, gate 30 remains closed and no signal is applied to control circuit 27 to initiate the next press cycle. Line 31 is also connected through an inverter 32 to a second AND gate 33 to which is also applied the coincidence signal on line 26. If coincidence occurs before the reset signal on line 28, the coincidence signal is passed by gate 32 to a line 34 to stop both the manipulator and forge. The appearance of a signal on line 34 is an indication that the set speed of the manipulator was too fast and further forging is to be effected manually until the manipulator speed can be decreased appropriately.

We claim:

1. A method of operating a forging press having a movable press tool and a manipulator to forge a workpiece in a succession of bites along its length, the workpiece being mounted on the manipulator for lengthwise movement relative thereto, in which method the manipulator is moved continuously in the direction of the length of the workpiece at a speed determined by the press operator, the distance moved by the manipulator is continuously compared with a required forging bite increment and each time the workpiece completes movement equal to said required bite increment a press cycle is automatically initiated so long as the movable press tool is at its position from which the press cycle commences, but a press cycle is not initiated and the movement of the manipulator is stopped if the movable press tool is not at said position.

2. A system for controlling a forging press having a movable press tool and a manipulator adapted to move continuously in the direction of the length of a workpiece mounted on the manipulator for lengthwise movement relative thereto, said system comprising means for producing a first electrical signal proportional to the distance travelled by the manipulator, means for producing a second electrical signal proportional to the desired bite increment of the workpiece, means for continuously comparing said signals and producing a third electrical signal each time said first and second signals are equal, and means utilizing said third signal to automatically initiate a press cycle when the movable press tool is in its position from which the press cycle commences, but stop the manipulator without initiating a press cycle when the movable press tool is not in said position.

3. A system for controlling a forging press having a movable press tool and a manipulator adapted to move continuously in the direction of the length of a workpiece mounted on the manipulator for lengthwise movement relative thereto, said system comprising means for producing a first electrical signal proportional to the distance travelled by the manipulator, means for producing a second electrical signal proportional to the desired bite increment of the workpiece, means for comparing said first and second signals and for producing a third electrical signal when said first and second signals are equal, means for producing a fourth electrical signal indicative of whether the press tool is in its position from which the press cycle commences, and gate means to which said third and fourth signals are applied and which produces a control signal to initiate a press cycle and reset the means for producing the first signal when said fourth signal indicates that the press tool is in its commencing position, and which only produces a signal to stop the press and the manipulator if the fourth signal indicates that the press tool is not in said position.

4. A system as claimed in claim 3 in which the means for producing the first electrical signal comprising a pulse generator adapted to produce a pulse for each unit movement of the manipulator and a counter to which said pulses are applied and which produces an electrical signal proportional to the count.

References Cited

UNITED STATES PATENTS

| | | | |
|---|---|---|---|
| 3,167,978 | 2/1965 | Wistreich et al. | 72—421 |
| 3,267,708 | 8/1966 | Sims et al. | 72—421 X |
| 3,274,819 | 9/1966 | Knowles | 72—421 |
| 3,285,044 | 11/1966 | Gregson et al. | 72—421 X |

CHARLES W. LANHAM, *Primary Examiner.*

E. SUTTON, *Assistant Examiner.*

U.S. Cl. X.R.

72—421